(12) United States Patent
Komaki et al.

(10) Patent No.: US 7,880,960 B2
(45) Date of Patent: Feb. 1, 2011

(54) OPTICAL AMPLIFIER AND ABNORMALITY DETECTION METHOD FOR THE SAME

(75) Inventors: Kosuke Komaki, Kawasaki (JP); Yuji Tamura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 84 days.

(21) Appl. No.: 12/489,956

(22) Filed: Jun. 23, 2009

(65) Prior Publication Data
US 2009/0257115 A1    Oct. 15, 2009

Related U.S. Application Data

(63) Continuation of application No. PCT/JP2006/326235, filed on Dec. 28, 2006.

(51) Int. Cl.
*H01S 3/00* (2006.01)
(52) U.S. Cl. ............... 359/337.1; 359/337.4; 359/337.5
(58) Field of Classification Search ............... 359/337.1, 359/337.4, 337.5
See application file for complete search history.

(56) References Cited

U.S. PATENT DOCUMENTS

| | | | |
|---|---|---|---|
| 5,966,237 A | 10/1999 | Sugaya et al. | |
| 5,995,274 A | 11/1999 | Sugaya et al. | |
| 6,025,947 A | 2/2000 | Sugaya et al. | |
| 6,144,485 A | 11/2000 | Sugaya et al. | |
| 6,157,481 A | 12/2000 | Sugaya et al. | |
| 6,198,572 B1 | 3/2001 | Sugaya et al. | |
| 6,377,395 B2 | 4/2002 | Sugaya et al. | |
| 6,421,167 B1 * | 7/2002 | Cohen et al. | 359/337 |
| 6,646,791 B2 | 11/2003 | Sugaya et al. | |
| 6,865,016 B2 | 3/2005 | Sugaya et al. | |
| 7,215,464 B1 * | 5/2007 | Komaki et al. | 359/341.44 |
| 2002/0044336 A1 | 4/2002 | Tanaka et al. | |
| 2003/0147123 A1 | 8/2003 | Kinoshita et al. | |
| 2004/0100688 A1 | 5/2004 | Iizuka et al. | |
| 2005/0046927 A1 | 3/2005 | Sugaya et al. | |

FOREIGN PATENT DOCUMENTS

JP    10-51057    2/1998

(Continued)

OTHER PUBLICATIONS

International Search Report for International Application No. PCT/JP2006/326235, mailed Apr. 17, 2007.

*Primary Examiner*—Mark Hellner
(74) *Attorney, Agent, or Firm*—Staas & Halsey LLP

(57) ABSTRACT

An optical amplifier includes a first optical amplification unit that amplifies input light, a variable optical attenuation unit that attenuates an output of the first optical amplification unit, a second optical amplification unit that amplifies an output of the variable optical attenuation unit, and a loss amount control unit that controls the variable optical attenuation unit, wherein an external attenuating optical medium is inserted between the variable optical attenuation unit and the second optical amplification unit. The optical amplifier includes an abnormality detecting unit that detects abnormality in optical loss based on a light level between the external attenuating optical medium and the second optical amplification unit, and a detection invalidating unit that invalidates any abnormality detected by the abnormality detecting unit when a light level between the variable optical attenuation unit and the external attenuating optical medium is lower than a threshold level.

8 Claims, 7 Drawing Sheets

FOREIGN PATENT DOCUMENTS

| | | |
|---|---|---|
| JP | 2003-289166 | 10/2003 |
| JP | 2004-72062 | 3/2004 |
| JP | 2004-96490 | 3/2004 |
| JP | 2005-192056 | 7/2005 |
| JP | 2006-121110 | 5/2006 |
| WO | 99/40695 | 8/1999 |
| WO | 02/21204 A1 | 3/2002 |

* cited by examiner

OPTICAL AMPLIFIER AND ABNORMALITY DETECTION METHOD FOR THE SAME

CROSS REFERENCE TO RELATED APPLICATION

The present application is a continuation application based on International application No. PCT/JP2006/326235, filed on Dec. 28, 2006.

TECHNICAL FIELD

The present invention relates to an optical amplifier for amplifying wavelength-division multiplexed light. More particularly, the invention relates to an optical amplifier wherein an external attenuating optical medium, such as a dispersion-compensating fiber transmission line, is inserted between two optical amplification stages, and a variable optical attenuation unit compensates for variations in the optical loss of the external attenuating optical medium, thereby maintaining the amount of loss between the external attenuating optical medium and the variable optical attenuation unit at a constant level.

BACKGROUND ART

An optical amplifier apparatus used at a receiver or a repeater in a wavelength-division multiplexed optical transmission system includes an optical fiber amplifier that uses a fiber doped with a rare earth element, generally, an erbium-doped fiber (hereinafter abbreviated "EDF"). FIG. 1 is a block diagram of a prior art optical fiber amplifier.

The optical fiber amplifier 1 includes the following components between an input end Ti and an output end To: a first optical amplification unit 10 for amplifying input light entering from the input end Ti, a variable optical attenuation unit 20 for attenuating the light amplified by the first optical amplification unit 10, and a second optical amplification unit 30 for amplifying the light passed through the variable optical attenuation unit 20. An output port 21 and an input port 22, between which is inserted a dispersion-compensating fiber (DCF) 22 for compensating for the dispersion of light in a transmission line, are provided between the variable optical attenuation unit 20 and the second optical amplification unit 30.

The light input to the first optical amplification unit 10 is passed through an optical splitting coupler 11 and an optical wavelength-division multiplexing coupler 12 in this order, and then supplied into an EDF 13. Pump light from a laser diode (LD) 14 is also supplied via the optical wavelength-division multiplexing coupler 12 into the EDF 13 where the input light is amplified by the gain proportional to the power of the pump light. The amplified light is passed through an optical splitting coupler 15 and emerges from the first optical amplification unit 10.

The optical fiber amplifier 1 is provided with photodetectors (PDs) 41 and 42, which respectively detect the light levels of the input light to and output light from the first optical amplification unit 10. The photodetector 41 converts the light separated by the optical splitting coupler 11 into an electrical signal. The photodetector 42 converts the light separated by the optical splitting coupler 15 into an electrical signal. The electrical signals from the photodetectors 41 and 42 are supplied to an automatic gain control (AGC) unit 16.

A control signal from the automatic gain control unit 16 is supplied to the laser diode 14, a pump signal generators and the automatic gain control unit 16 controls the signal gain of the first optical amplification unit 10 to a constant level. The gain versus wavelength characteristic of the EDF 13 is thus maintained constant.

The light amplified by the first optical amplification unit 10 is attenuated by the variable optical attenuation unit 20, and then passed through an optical splitting coupler 52 and supplied via the output port 21 into the dispersion-compensating fiber 22. As the light passes through the dispersion-compensating fiber 22, the dispersion that the light suffers when transmitted through the transmission line is compensated for, and the dispersion compensated light is again input to the optical fiber amplifier 1 via the input port 23 and fed into the second optical amplification unit 30.

The light input to the second optical amplification unit 30 is passed through an optical splitting coupler 31 and an optical wavelength-division multiplexing coupler 32 in this order, and then supplied into an EDF 33. Pump light from a laser diode 34 is also supplied via the optical wavelength-division multiplexing coupler 32 into the EDF 33 where the input light is amplified by the gain proportional to the power of the pump light.

The optical fiber amplifier 1 is provided with photodetectors (PDs) 44 and 45 which respectively detect the light levels of the input light to and output light from the second optical amplification unit 30. The photodetector 44 converts the light separated by the optical splitting coupler 31 into an electrical signal. The photodetector 45 converts the light separated by an optical splitting coupler 35 into an electrical signal. The electrical signals from the photodetectors 44 and 45 are supplied to an automatic gain control unit 36.

A control signal from the automatic gain control unit 36 is supplied to the laser diode 34, a pump light emitter, and the automatic gain control unit 36 controls the signal gain of the second optical amplification unit 30 to a constant level. The light amplified by the second optical amplification unit 30 is passed through the optical splitting coupler 35 and emerges from the second optical amplification unit 30; the light is further passed through the output end To and output from the optical fiber amplifier 1.

The optical fiber amplifier 1 is also provided with a DCF loss compensating unit 51 for compensating for variations in the amount of loss in the dispersion-compensating fiber 22 installed between the output port 21 and the input port 23. The DCF loss compensating unit 51 receives the electrical signals from the photodetectors 42 and 44, and controls the amount of loss (attenuation) in the variable optical attenuation unit 20 so that the difference between the output light level of the first optical amplification unit 10 and the output light level of the dispersion compensating fiber 22 is held constant, thus maintaining the total amount of loss, i.e., the sum of the amount of loss in the variable optical attenuation unit 20 and the amount of loss in the dispersion-compensating fiber 22, at a constant level by compensating for variations in the optical loss of the dispersion-compensating fiber 22.

The optical fiber amplifier 1 further includes a DCF disconnection detecting unit 62 which outputs a DCF-disconnected notification when it is detected that the dispersion-compensating fiber 22 is disconnected from the output port 21 or the input port 23, and an abnormal loss detecting unit 61 which outputs an abnormal loss notification when it is detected that the amount of loss in the dispersion-compensating fiber 22 is excessive. The DCF-disconnected notification is delivered, for example, to another optical amplifier provided in the upstream direction, and the upstream optical amplifier that received the DCF-disconnected notification recognizes the occurrence of abnormality in the optical fiber amplifier 1 and performs processing for safety, for example, by reducing the signal output level.

Alternatively, the DCF-disconnected notification is delivered to the automatic gain control unit 16, and the automatic gain control unit 16 that detected the occurrence of abnormality in the optical fiber amplifier 1 performs processing for safety, for example, by reducing the gain of the first optical amplification unit 10.

The abnormal loss notification is used to provide warning to the user after starting the operation. Abnormality in the optical loss of the dispersion-compensating fiber 22 could lead to signal degradation.

FIG. 2 is a level diagram of the light levels detected within the optical fiber amplifier 1 for illustrating a first example of a prior art abnormality detection method. The diagram illustrates the light levels detected by the photodetectors 41 to 45 when the number of multiplexed wavelengths input to the optical fiber amplifier 1 is 0, 1, and 40, respectively. The photodetector 43 converts the light separated by the optical splitting coupler 52, provided between the variable optical attenuation unit 20 and the dispersion-compensating fiber 22, into an electrical signal.

In the diagram, solid lines between the PDs 42 and 44 indicate the light levels detected when the dispersion-compensating fiber 22 having a maximum amount of loss permitted by the rating of the optical fiber amplifier 1 as the amount of loss due to the insertion of the dispersion-compensating fiber is installed between the output port 21 and the input port 23, and semi-dashed lines indicate the light levels detected when the dispersion-compensating fiber 22 having a minimum amount of loss permitted by the rating of the optical fiber amplifier 1 is installed between the output port 21 and the input port 23.

Hereinafter, the maximum and minimum values permitted by the rating of the optical fiber amplifier 1 for the amount of loss in the dispersion-compensating fiber 22 installed between the output port 21 and the input port 23 are designated Lomax and Lomin, respectively.

Further, the amount of loss in the variable optical attenuation unit 20 that is necessary to provide compensation when the amount of loss in the dispersion-compensating fiber 22 is Lomax, i.e., the target value to which the amount of loss in the variable optical attenuation unit 20 is to be controlled by the DCF loss compensating unit 51 when the amount of loss in the dispersion-compensating fiber 22 is Lomax, is designated Vo1, and the amount of loss in the variable optical attenuation unit 20 that is necessary to provide compensation when the amount of loss in the dispersion-compensating fiber 22 is Lomin is designated Vo2. The DCF loss compensating unit 51 controls the amount of loss in the variable optical attenuation unit 20 so that the sum of the amount of loss in the variable optical attenuation unit 20 and the amount of loss in the dispersion-compensating fiber 22 becomes equal to a constant value given by Vo1+Lomax (=Vo2+Lomin).

When the output light level of the dispersion-compensating fiber 22, detected by the photodetector 44, is smaller than a predetermined threshold value T1, the DCF disconnection detecting unit 62 outputs the DCF-disconnected notification by determining that the dispersion-compensating fiber 22 is disconnected. The threshold value T1 is set to a value that is lower by a predetermined margin than the minimum value Lv4 that the light level detected by the photodetector 44 can take when the optical fiber amplifier 1 is operating normally.

The minimum value Lv4 is determined in advance by assuming the situation in which the number of multiplexed wavelengths input is 0 and the amount of loss in the variable optical attenuation unit 20 remains at Vo2 though the dispersion-compensating fiber 22 whose amount of loss is Lomax has been installed. The light level in this situation is indicated by a two-dot dashed line.

When the difference between the light levels before and after the dispersion-compensating fiber 22, i.e., the difference between the electrical signals output from the photodetectors 43 and 44, is larger than a predetermined threshold value TL, the abnormal loss detecting unit 61 outputs the abnormal loss notification by determining that the loss in the dispersion-compensating fiber 22 is excessive. The threshold value TL is set equal to a value obtained by adding a margin to the maximum value Lomax permitted by the rating of the optical fiber amplifier 1 for the amount of loss in the dispersion-compensating fiber.

Patent document 1 below discloses a method in which amplified spontaneous emission (ASE) light is transmitted from the upstream amplifier, and using this light, the transmission line loss is measured and the gain of the amplifier is determined before starting the operation.

Patent document 1: Japanese Unexamined Patent Publication No. 2004-072062

Patent document 2: Japanese Unexamined Patent Publication No. 2006-121110

Patent document 3: Japanese Unexamined Patent Publication No. H10-51057

DISCLOSURE OF THE INVENTION

When detecting a disconnection of the dispersion-compensating fiber 22 or an excessive loss in the dispersion-compensating fiber 22, the light level after passing through the dispersion-compensating fiber 22 needs to be detected (in the configuration example of FIG. 1, the light level is detected by the photodetector 44). Accordingly, before starting the operation of the optical transmission system, i.e., in a standby state in which the number of multiplexed wavelengths input to the optical fiber amplifier 1 is 0, if a disconnection of the dispersion-compensating fiber 22 is to be detected, the light detected by the photodetector 44 is only the ASE light, and the light level detected in this case is more than 10 dB lower than in the case where a signal wave of one wavelength is input. For a fiber cut or a fiber disconnection in the transmission line, it is also possible to use optical supervisory channel (OSC) light, but there is no OSC light in the optical fiber amplifier 1.

As a result, the range of the light level to be detected by the photodetector 44 increases up to the range depicted in FIG. 2, i.e., the range extending from the threshold value T1 up to the "light level to be detected when signals with a maximum number of wavelengths (40 in the example depicted) are input," and the detection accuracy of the photodetector 44 drops, leading to the possibility that a false abnormality notification may be output.

The abnormal loss notification is used after starting the operation of the optical fiber amplifier 1, but even before starting the operation, it is not desirable to output a false abnormality notification.

In recent years, there has developed a need for an optical fiber amplifier that can accommodate larger optical loss variations among individual dispersion-compensating fibers 22, and also a need for an optical fiber amplifier that can singly handle transmission lines having varying degrees of losses. It is therefore expected that the range of the light level to be detected by the photodetector 44 will become increasingly larger in the future.

To prevent an erroneous detection by reducing the detection range of the photodetector 44, one possible method would be to permit the use of the abnormality notification after allowing abnormality to be detected continuously for a predetermined period of time. That is, as illustrated in FIG. 3, if the number of multiplexed wavelengths input to the optical fiber amplifier 1 is 0, and if, at a given point in time, the detection value of the photodetector 44 has dropped to Lv4, the detection value of the photodetector 44 will increase from Lv4 to Lv4' because of the action of the variable optical attenuation unit 20 controlled by the DCF loss compensating unit 51, as long as the proper dispersion-compensating fiber 22 is correctly connected to the optical fiber amplifier 1.

Accordingly, in the normal condition, if the detection level of the photodetector 44 drops below Lv4', since the detection level of the photodetector 44 increases up to Lv4' or higher after the predetermined time that the DCF loss compensating unit 51 takes to control has elapsed, the detection range of the photodetector 44 that is necessary for detecting abnormality can be reduced.

However, if the abnormality notification is thus delayed, then even when the optical signal carrying signals at a maximum number of wavelengths is actually leaking because of a disconnection of the dispersion-compensating fiber 22, the notification is also delayed, causing a delay in performing the earlier described safety operation. Since the control cycle of the DCF loss compensating unit 51 is several hundred hertz to several thousand hertz, the dangerous condition caused by the optical signal leakage continues for several hundred milliseconds to several seconds.

In view of the above problem, it is an object of the present invention to provide an optical fiber amplifier having first and second optical amplification units in which, to detect the occurrence of abnormality in an external attenuating optical medium such as a dispersion-compensating fiber inserted between the optical amplification units, a photodetector is provided downstream of the dispersion-compensating fiber, wherein provisions are made to reduce the detection range of the photodetector and thereby enhance the detection accuracy of the photodetector.

To achieve the above object, in the present invention, the light level is detected at a stage preceding the external attenuating optical medium, and if the detected light level is lower than a predetermined threshold level, abnormality detection is invalidated.

According to a first mode of the present invention, there is provided an optical amplifier for amplifying wavelength-division multiplexed light, including a first optical amplification unit that amplifies input light, a variable optical attenuation unit that attenuates an output of the first optical amplification unit, a second optical amplification unit that amplifies an output of the variable optical attenuation unit, and a loss amount control unit that controls an amount of loss to be introduced by the variable optical attenuation unit, wherein an external attenuating optical medium is inserted between the variable optical attenuation unit and the second optical amplification unit. The loss amount control unit compensates for variations in optical loss of the external attenuating optical medium by controlling the amount of loss to be introduced by the variable optical attenuation unit. The optical amplifier further includes an abnormality detecting unit that detects abnormality in optical loss between the first and second optical amplification units based on a light level detected between the external attenuating optical medium and the second optical amplification unit, and a detection invalidating unit that invalidates any abnormality detected by the abnormality detecting unit when a light level detected between the variable optical attenuation unit and the external attenuating optical medium is lower than a predetermined threshold level.

According to a second mode of the present invention, there is provided an optical amplifier for amplifying wavelength-division multiplexed light, including a first optical amplification unit that amplifies input light, a variable optical attenuation unit that attenuates an output of the first optical amplification unit, a second optical amplification unit that amplifies an output of the variable optical attenuation unit, and a loss amount control unit that controls an amount of loss to be introduced by the variable optical attenuation unit, wherein an external attenuating optical medium is inserted between the variable optical attenuation unit and the second optical amplification unit. The loss amount control unit compensates for variations in optical loss of the external attenuating optical medium by controlling the amount of loss to be introduced by the variable optical attenuation unit. The optical amplifier further includes an abnormal loss detecting unit that detects an excessive loss in the external attenuating optical medium based on a difference between light levels detected before and after the external attenuating optical medium, and an abnormal loss detection invalidating unit that invalidates any abnormality detected by the abnormal loss detecting unit when the light level detected between the variable optical attenuation unit and the external attenuating optical medium is lower than a predetermined threshold level. The predetermined threshold level is set equal to the light level that the variable optical attenuation unit is to output when the number of multiplexed wavelengths input to the optical amplifier is 1 and when the amount of loss introduced by the variable optical attenuation unit is equal to a predetermined amount of loss, wherein the predetermined amount of loss is the amount of loss necessary to compensate for a predetermined minimum amount of loss permitted in the optical amplifier as the amount of loss due to the insertion of the external attenuating optical medium.

According to a third mode of the present invention, there is provided an abnormality detection method for use in an optical amplifier for amplifying wavelength-division multiplexed light. The optical amplifier includes a first optical amplification unit which amplifies input light, a variable optical attenuation unit which attenuates an output of the first optical amplification unit, a second optical amplification unit which amplifies an output of the variable optical attenuation unit, and a loss amount control unit which controls an amount of loss to be introduced by the variable optical attenuation unit. The abnormality detection method detects abnormality in optical loss between the first and second optical amplification units. The loss amount control unit compensates for variations in optical loss of an external attenuating optical medium by controlling the amount of loss to be introduced by the variable optical attenuation unit. The method detects abnormality in optical loss between the first and second optical amplification units based on a light level detected between the external attenuating optical medium and the second optical amplification unit, and disables detection of the abnormality when a light level detected between the variable optical attenuation unit and the external attenuating optical medium is lower than a predetermined threshold level.

According to a fourth mode of the present invention, there is provided an abnormality detection method for use in an optical amplifier for amplifying wavelength-division multiplexed light. The optical amplifier includes a first optical amplification unit that amplifies input light, a variable optical attenuation unit that attenuates an output of the first optical amplification unit, a second optical amplification unit that amplifies an output of the variable optical attenuation unit, and a loss amount control unit that controls an amount of loss to be introduced by the variable optical attenuation unit. The abnormality detection method detects abnormality in optical loss between the first and second optical amplification units. The loss amount control unit compensates for variations in optical loss of an external attenuating optical medium by controlling the amount of loss to be introduced by the variable optical attenuation unit. The method detects an excessive loss in the external attenuating optical medium based on a difference between light levels detected before and after the external attenuating optical medium, and disables detection of the abnormality when the light level detected between the variable optical attenuation unit and the external attenuating optical medium is lower than a predetermined threshold level. The predetermined threshold level is set equal to the light level that the variable optical attenuation unit is to output when the number of multiplexed wavelengths input to the optical amplifier is 1 and when the amount of loss provided by the variable optical attenuation unit is equal to a predetermined amount of loss, wherein the predetermined amount of loss is the amount of loss necessary to compensate for a predetermined minimum amount of loss permitted in the optical amplifier as the amount loss due to the insertion of the external attenuating optical medium.

According to the present invention, since the detection of abnormality is not performed when the input light level to the external attenuating optical medium is lower than the predetermined threshold level, an erroneous detection can be prevented even when the light level after passing through the external attenuating optical medium is low and the detection accuracy of the detecting means is not high enough to detect this light level. On the other hand, when the input light level to the external attenuating optical medium is higher than the predetermined threshold level, the detection of abnormality is performed, so that if the external attenuating optical medium becomes disconnected from the optical amplifier, leakage of high output light can be detected instantly.

DESCRIPTION OF THE REFERENCE NUMERALS

1. Optical Fiber Amplifier
10, 30. OPTICAL AMPLIFICATION UNIT
20. VARIABLE OPTICAL ATTENUATION UNIT
22. DISPERSION-COMPENSATING FIBER

BEST MODE FOR CARRYING OUT THE INVENTION

Figure 1:
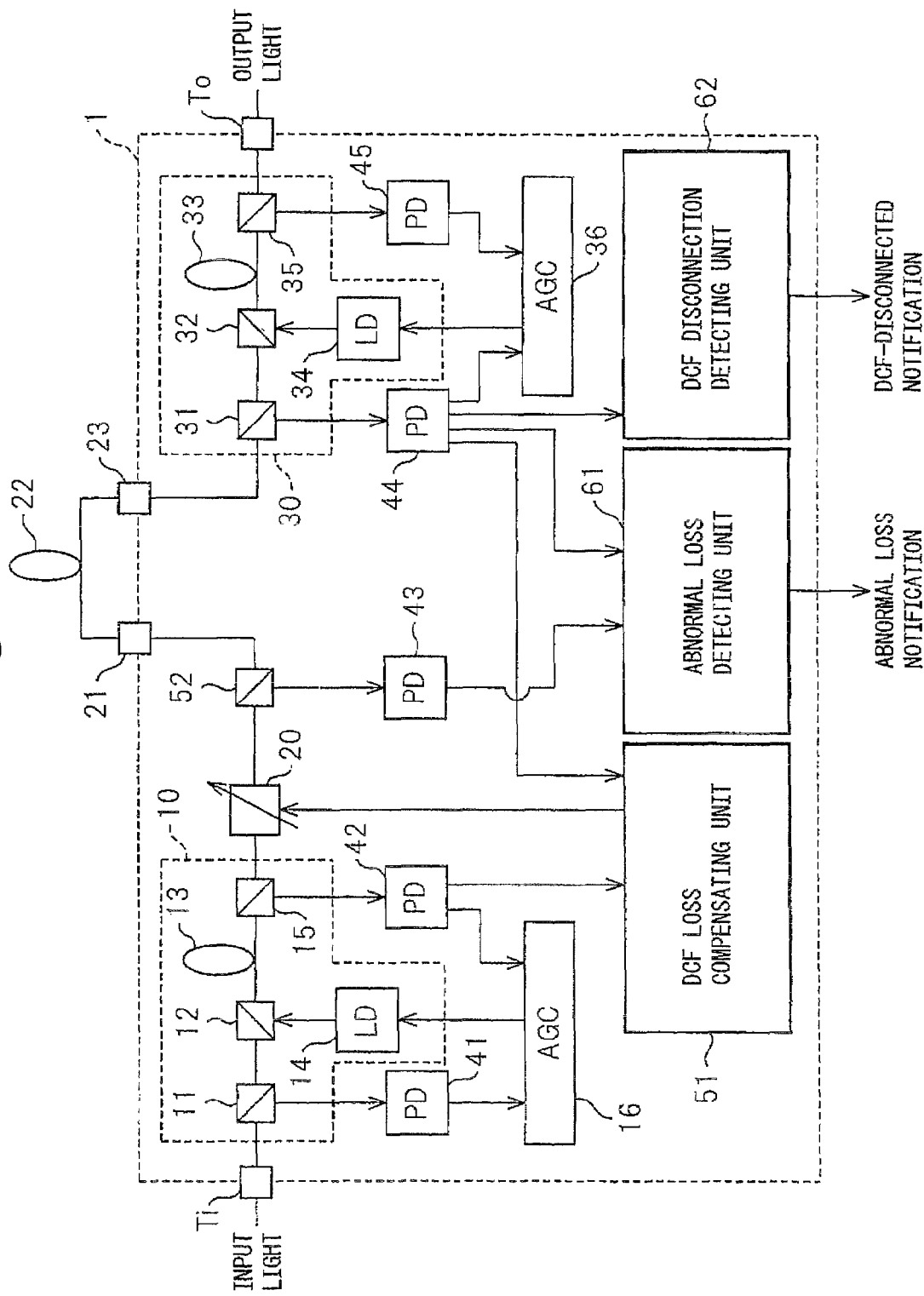
FIG. 1 is a block diagram of a prior art optical fiber amplifier.
Figure 2:
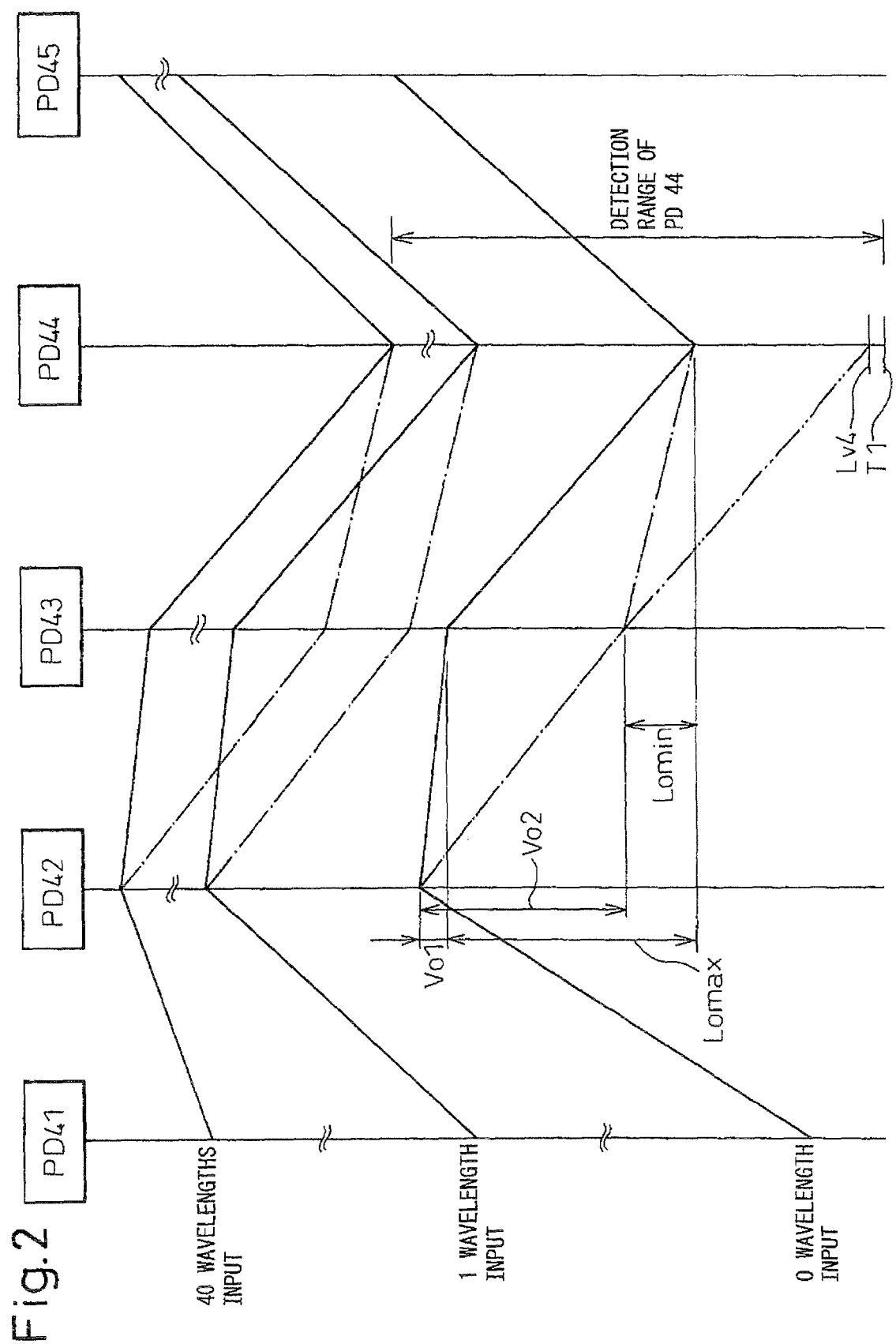
FIG. 2 is a level diagram of the light levels detected within the optical fiber amplifier for illustrating a first example of a prior art abnormality detection method.
Figure 3:
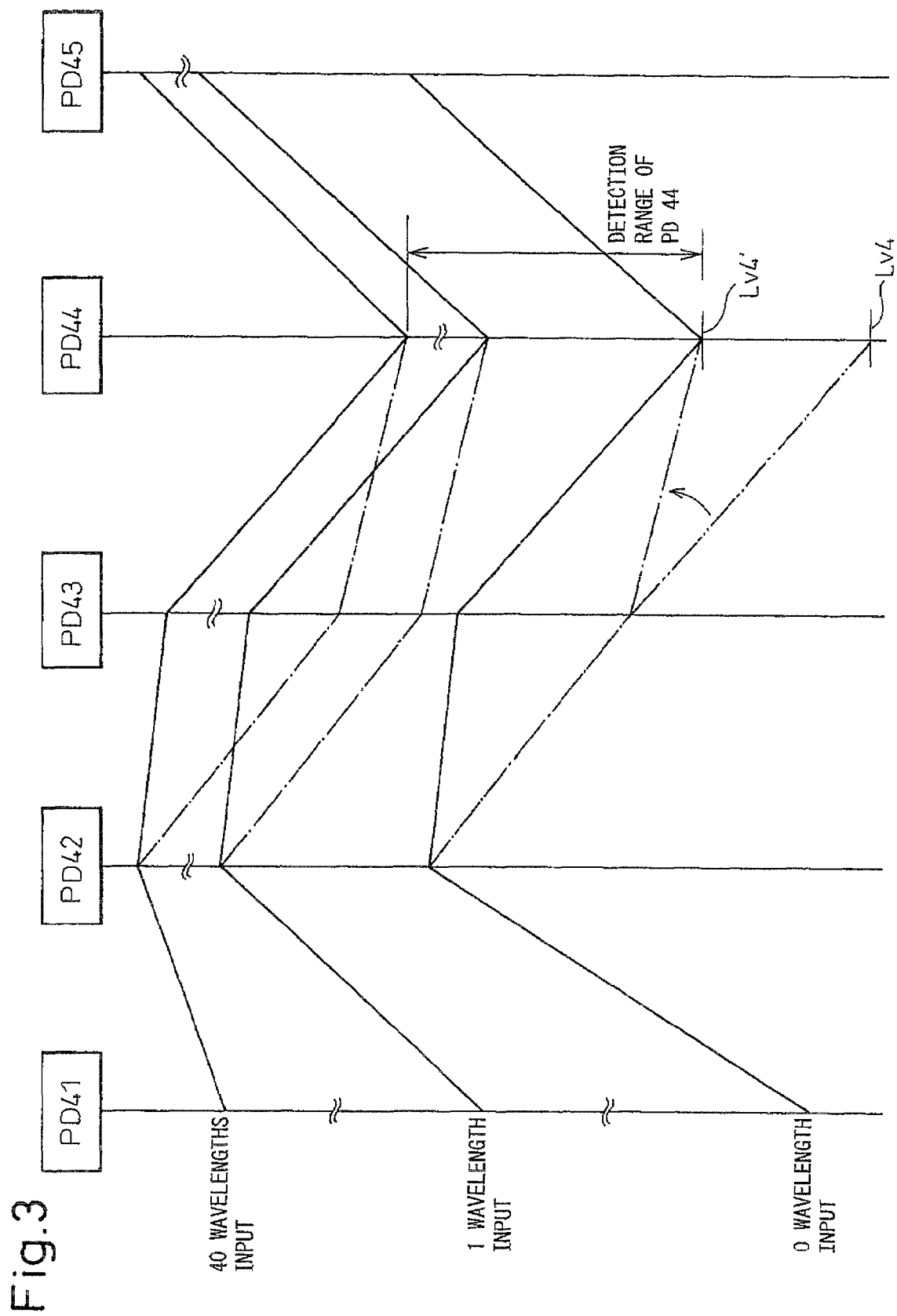
FIG. 3 is a level diagram of the light levels detected within the optical fiber amplifier for illustrating a second example of the prior art abnormality detection method.
Figure 4:
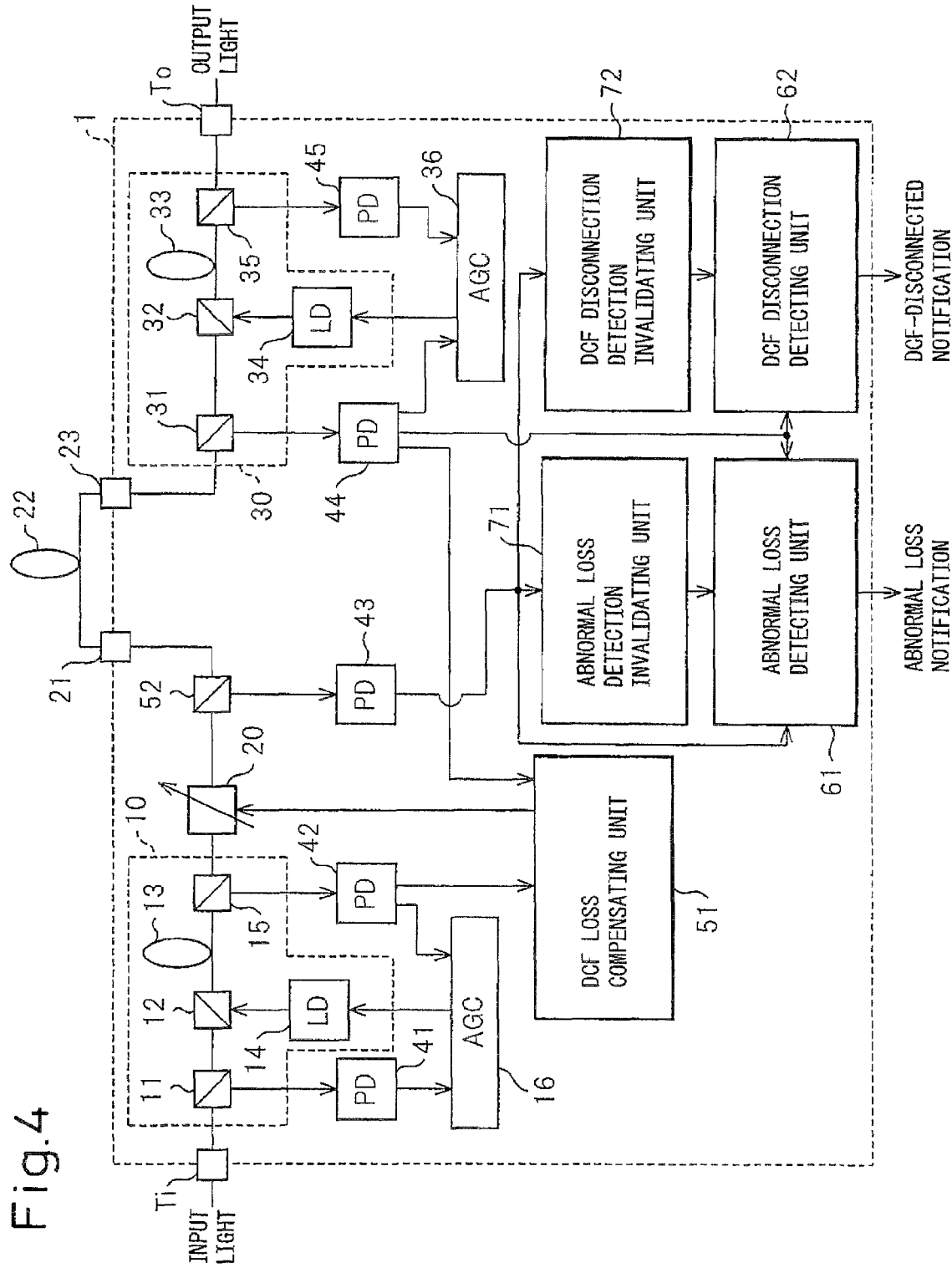
FIG. 4 is a block diagram of an optical fiber amplifier according to an embodiment of the present invention.

The embodiments of the present invention will be described below with reference to the accompanying drawings. FIG. 4 is a block diagram of an optical fiber amplifier according to an embodiment of the present invention. The optical fiber amplifier 1 is similar in configuration to the optical fiber amplifier depicted in FIG. 1, and to simplify the description, the same component elements are designated by the same reference numerals and will not be discussed in detail herein; further, it is to be understood that such components are similar in function, unless specifically stated otherwise.

The DCF loss compensating unit 51 corresponds to the loss amount control unit described in the appended claims, the DCF disconnection detecting unit 62 and the abnormal loss detecting unit 61 each correspond to the abnormality detecting unit described in the appended claims, and the abnormal loss detecting unit 61 corresponds to the abnormal loss detecting unit described in the appended claims.

The optical fiber amplifier 1 includes a DCF disconnection detection invalidating unit 72 which outputs a detection invalidating signal to the DCF disconnection detecting unit 62 when the light level detected by the photodetector 43 is lower than a predetermined invalidation threshold level Tc1, and an abnormal loss detection invalidating unit 71 which outputs a detection invalidating signal to the abnormal loss detecting unit 61 when the light level detected by the photodetector 43 is lower than a predetermined invalidation threshold level Tc2. The invalidation threshold level Tc1 is set in advance as will be described hereinafter, and stored in a storage means (not depicted) internal to the DCF disconnection detection invalidating unit 72; likewise, the invalidation threshold level Tc2 is set in advance as will be described hereinafter, and stored in a storage means (not depicted) internal to the abnormal loss detection invalidating unit 71.

When the detection invalidating signal is received from the DCF disconnection detection invalidating unit 72, the DCF disconnection detecting unit 62 stops detecting whether or not the dispersion-compensating fiber 22 becomes disconnected from the output port 21 or the input port 22. Alternatively, when the detection invalidating signal is received, the DCF disconnection detecting unit 62 disables the output of the DCF-disconnected notification.

When the detection invalidating signal is received from the abnormal loss detection invalidating unit 71, the abnormal loss detecting unit 61 stops detecting whether the loss in the dispersion-compensating fiber 22 is excessive or not. Alternatively, when the detection invalidating signal is received, the abnormal loss detecting unit 61 disables the output of the abnormal loss notification.

Hence, the DCS disconnection detection invalidating unit 72 and the abnormal loss detection invalidating unit 71 each correspond to the detection invalidating unit described in the appended claims, and the abnormal loss detection invalidating unit 71 corresponds to the abnormal loss detection invalidating unit described in the appended claims.

Figure 5:
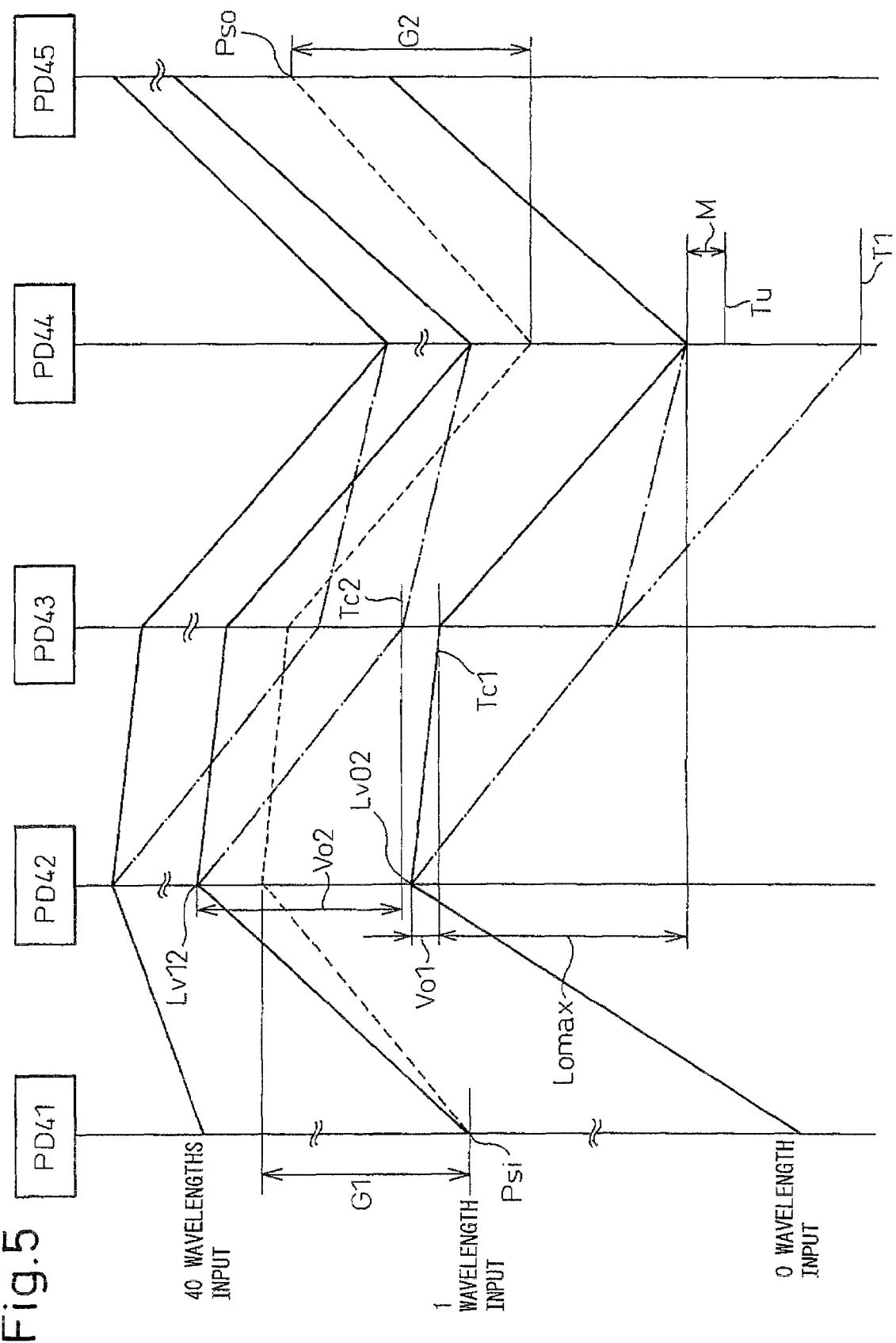
FIG. 5 is a level diagram of the light levels detected within the optical fiber amplifier 1 for illustrating the method of determining invalidation threshold levels.

FIG. 5 is a level diagram of the light levels detected within the optical fiber amplifier 1 for illustrating the method of determining the invalidation threshold levels Tc1 and Tc2.

The light level that the photodetector 43 is to detect when the number of multiplexed wavelengths input to the optical fiber amplifier 1 is 0, and when the loss due to the variable optical attenuation unit is minimum, is employed as the invalidation threshold level Tc1. Then, when the light level detected by the photodetector 44 is smaller than the threshold value Tu defined by the following equation (1), the DCF disconnection detecting unit 62 outputs the DCF-disconnected notification by determining that the dispersion-compensating fiber 22 is disconnected.

$$Tu = Tc1 - Lo\max - M \quad (1)$$

where Lomax is the predetermined maximum amount of loss permitted by the rating of the optical fiber amplifier 1 as the amount of loss due to the insertion of the dispersion-compensating fiber 22 between the output port 21 and the input port 22, and M is a predetermined margin. As is apparent from FIG. 5, the threshold value Tu is higher than the earlier described threshold value T1 employed in the prior art.

If the light level detected by the photodetector 43 is not lower than the invalidation threshold level Tc1, and if the proper dispersion-compensating fiber 22 is correctly connected to the optical fiber amplifier 1, the light level detected by the photodetector 44 necessarily exceeds the threshold value Tu, so that the correct connection of the dispersion-compensating fiber 22 can be detected using Tu, which is higher than the prior art threshold value T1.

If the dispersion-compensating fiber 22 becomes disconnected, then the light level being detected by the photodetector 44 drops, the DCF loss compensating unit 51 reduces the amount of loss to be introduced by the variable optical attenuation unit 20; as a result, the light level detected by the photodetector 43 necessarily exceeds the invalidation threshold level Tc1, and the DCF disconnection detecting unit 62 is thus enabled to output the DCF-disconnected notification.

Accordingly, the lower limit of the detection range of the photodetector 44, necessary for detecting the disconnection of the dispersion-compensating fiber 22, can be raised to the higher level Tu than the prior art threshold value T1. In this way, the detection range of the photodetector 44 can be reduced, which serves to enhance the detection accuracy.

On the other hand, when the light level detected by the photodetector 43 is lower than the invalidation threshold level Tc1, the level of the light fed into the dispersion-compensating fiber 22 can rise because of the action of the variable optical attenuation unit 20 controlled by the DCF loss compensating unit 51; in this case, if the light level detected by the photodetector 44 is compared with the threshold value Tu, it is not possible to determine whether the dispersion-compensating fiber 22 is disconnected or not. Therefore, during the period that the light level detected by the photodetector 43 is lower than the invalidation threshold level Tc1, the DCF disconnection detection invalidating unit 72 invalidates the detection operation of the DC disconnection detecting unit 62 for detecting the disconnection of the dispersion-compensating fiber 22 and thereby prevents the DCF-disconnected notification from being erroneously output.

In this case, even when the dispersion-compensating fiber 22 actually becomes disconnected, the DCF-disconnected notification is not output as long as the light level detected by the photodetector 43 is lower than the invalidation threshold level Tc1, but this does not present any danger, since the level of the light that leaks is sufficiently low (about −20 dB).

The following illustrates one example of the method of determining the invalidation threshold level Tc1. The dashed line in FIG. 5 indicates the design value of the level diagram for each wavelength signal contained in the wavelength-division multiplexed signals input to the optical fiber amplifier 1. Unlike the level diagram indicated by a solid line in FIG. 5 for the case when the number of multiplexed wavelengths is 1, the level diagram indicated by the dashed line does not include the increase in level due to the superimposition of the ASE light. In the figure, gain G1 is the signal gain provided by the first optical amplification unit 10, gain G2 is the signal gain provided by the second optical amplification unit 30, Psi is the input level per wavelength signal, and Pso is the output level per wavelength signal.

These gains G1 and G2 and the minimum value Vo1 of the amount of loss to be introduced by the variable optical attenuation unit 20, i.e., the target value Vo1 to which the amount of loss in the variable optical attenuation unit 20 is to be controlled by the DCF loss compensating unit 51 when the amount of loss in the dispersion-compensating fiber 22 is Lomax, are values predetermined by considering the cost and noise figure characteristics of the optical fiber amplifier 1. On the other hand, the signal input level Psi and output level Pso are values predetermined in accordance with the transmission system in which the optical fiber amplifier 1 is used.

When the number of multiplexed wavelengths input to the optical fiber amplifier 1 is 0, that is, when only the ASE light is input to the optical fiber amplifier 1, the light level Lv02 detected by the photodetector 42 represents the level only of the ASE light that is output from the EDF 13 depicted in FIG. 4. The light level Lv02 can be obtained using the following equation (2), from the light level Lv12 measured by the photodetector 42 when a signal whose number of multiplexed wavelengths is 1 is input to the optical fiber amplifier 1.

[Mathematical 1]

$$Lv02 = 10 \times \log(10^{\frac{Lv12}{10}} - 10^{\frac{Psi+G1}{10}}) \quad (2)$$

Accordingly, the invalidation threshold level Tc1 can be determined by the following equation (3).

$$Tc1 = Lv02 - Vo1 \quad (3)$$

On the other hand, the light level that the photodetector 43 is to detect when the number of multiplexed wavelengths input to the optical fiber amplifier 1 is 1, and when the loss due to the variable optical attenuation unit is equal to the predetermined amount of loss Vo2, is employed as the invalidation threshold level Tc2 based on which to disable the detection as to whether the amount of loss in the dispersion-compensating fiber 22 is excessive or not. The prescribed amount of loss Vo2 is, as earlier described, the target value to which the amount of loss in the variable optical attenuation unit 20 is to be controlled by the DCF loss compensating unit 51 when the amount of loss in the dispersion-compensating fiber 22 is at the minimum value Lomin, and is given by the following equation (4).

$$Vo2 = Vo1 + Lo\max - Lo\min \quad (4)$$

Accordingly, the invalidation threshold level Tc2 can be set as given by the following equation (5).

$$Tc2 = Lv12 - (Vo1 + Lo\max - Lo\min) \quad (5)$$

The thus set invalidation threshold level Tc2 is the minimum level that the photodetector 43 detects when the number of multiplexed wavelengths input to the optical fiber amplifier 1 is 1 or larger. Since the detection as to whether the amount of loss in the dispersion-compensating fiber 22 is excessive or not need be performed after starting the operation of the optical fiber amplifier 1, the abnormality detection operation of the abnormal loss detecting unit 61 can be invalidated without any problem when the light level detected by the photodetector 43 is lower than the invalidation threshold level Tc2. By setting the invalidation threshold level Tc2 as described above, the lower limit of the detection range of the photodetector 44, necessary for detecting whether the amount of loss in the dispersion-compensating fiber 22 is excessive or not, can be raised, which serves to enhance the detection accuracy.

On the other hand, after the operation of the optical fiber amplifier 1 has been started, the light level detected by the photodetector 43 is always higher than the invalidation threshold level Tc2, and the abnormal loss detecting unit 61 is thus enabled to output the abnormal loss notification.

Figure 6:
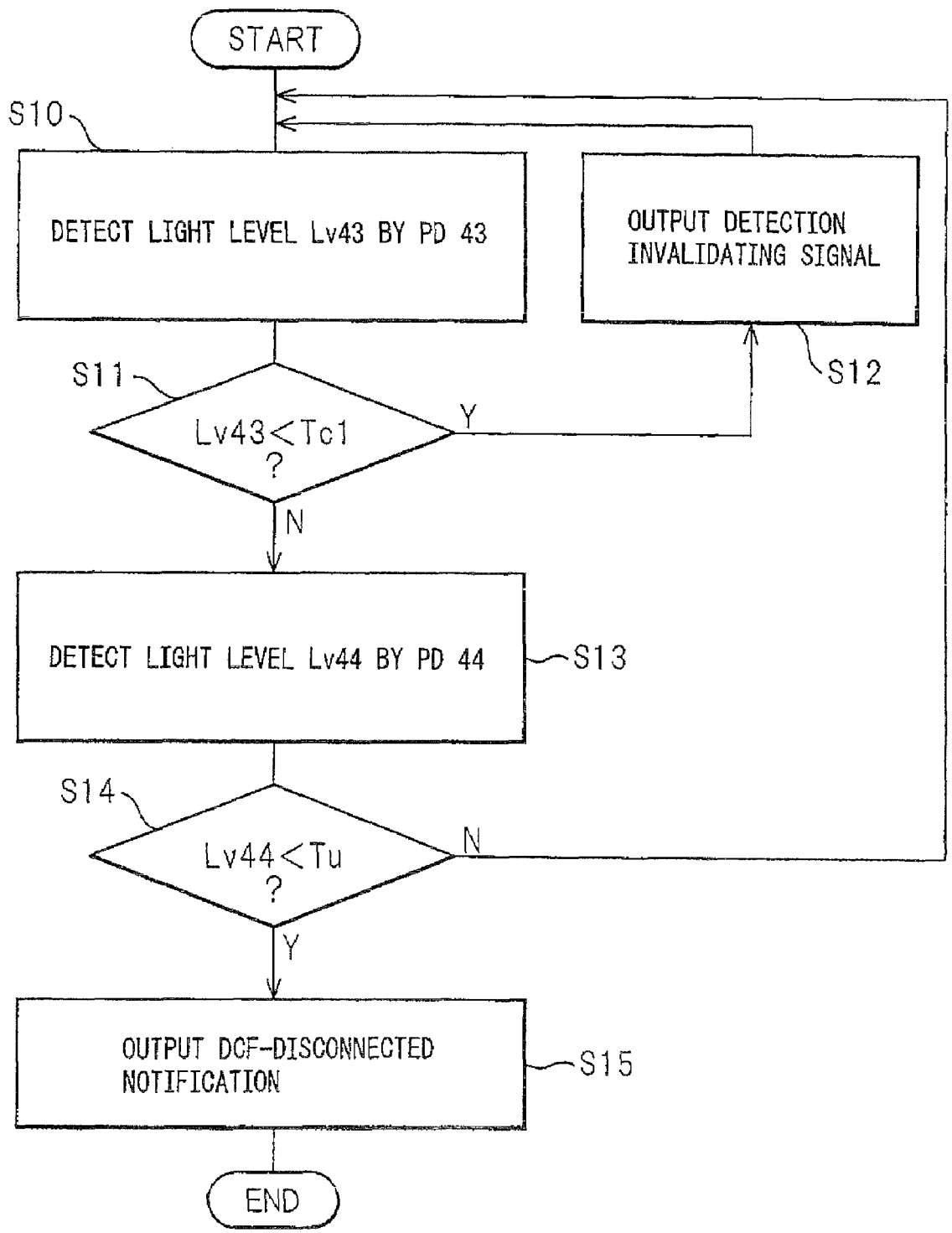
FIG. 6 is a flowchart illustrating a DCF disconnection detection method according to the embodiment of the present invention.

FIG. 6 is a flowchart illustrating the DCF disconnection detection method according to the embodiment of the present invention.

In step S10, the output light level L43 of the variable optical attenuation unit 20 is detected by the photodetector 43.

In step S81, the DCF disconnection detection invalidating unit 72 compares the light level L43 with the invalidation threshold level Tc1 and, if the light level L43 is lower than the invalidation threshold level Tc1, outputs the detection invalidating signal to the DCF disconnection detecting unit 62 to invalidate the detection operation of the DCF disconnection detecting unit 62 for detecting the disconnection of the dispersion-compensating fiber 22 (step S12). Then, the process returns to step S10.

When the DCF loss compensating unit 51 reduces the amount of loss to be introduced by the variable optical attenuation unit 20, and the light level L43 detected by the photodetector 43 increases, the light level L43 becomes higher than the invalidation threshold level Tc1 in step S1. In this case, the DCF disconnection detection invalidating unit 72 does not output the detection invalidating signal, and the process proceeds to step S13.

Then, the DCF disconnection detecting unit 62 compares the light level L44 detected by the photodetector 44 with the threshold value Tu (steps S13 and S14) and, if the light level L44 is lower than the threshold value Tu, outputs the DCF-disconnected notification (step S15).

According to this method, when the light level detected by the photodetector 44 is low, the abnormality detection is not performed, preventing the DCF-disconnected notification from being output erroneously. During the period that the detection invalidating signal is output, disconnection of the dispersion-compensating fiber 22 cannot be detected, but this does not present any problems since the level of the light that leaks in this case is miniscule.

Figure 7:
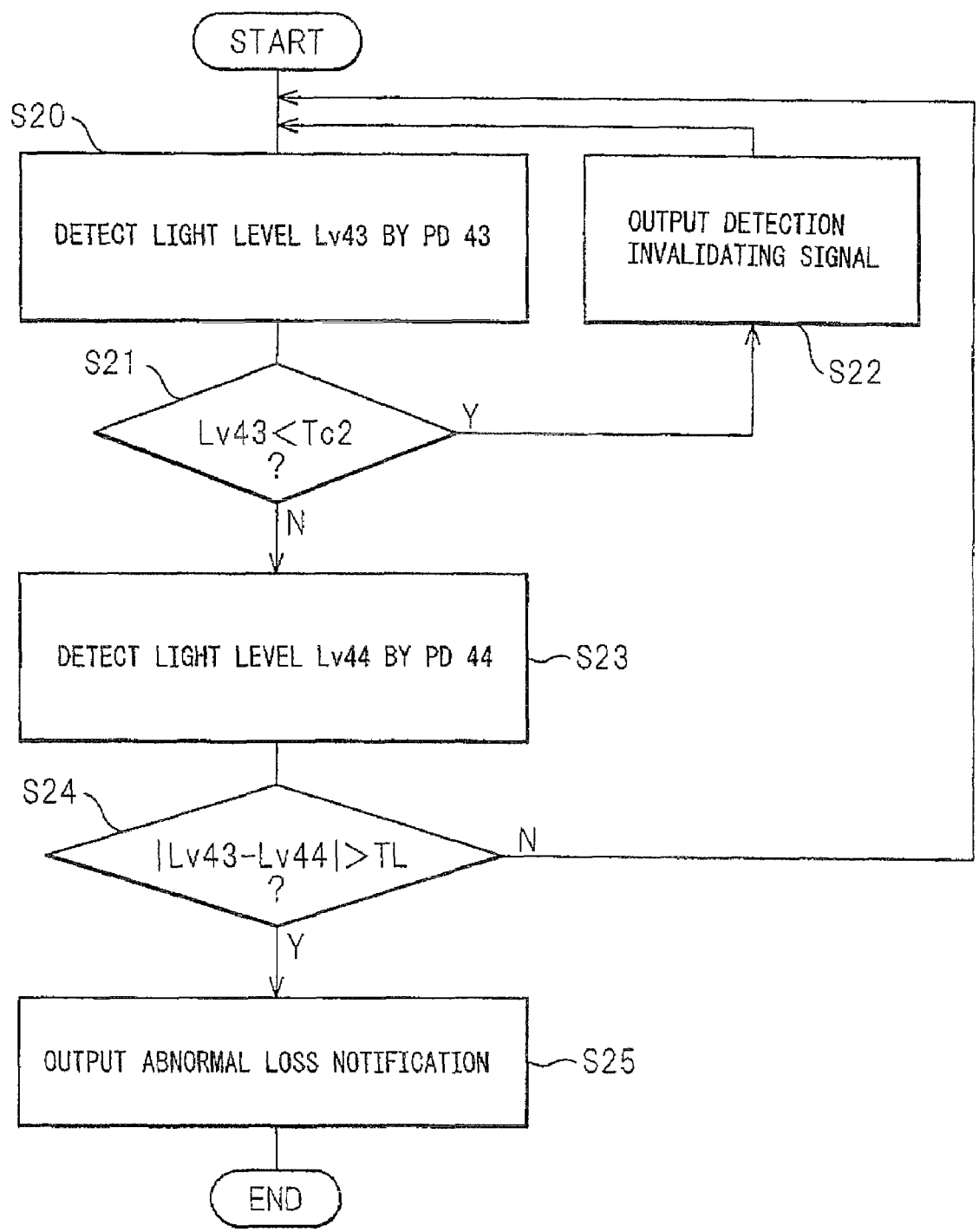
FIG. 7 is a flowchart illustrating an abnormal loss detection method according to the embodiment of the present invention.

FIG. 7 is a flowchart illustrating the abnormal loss detection method according to the embodiment of the present invention.

In step S20, the output light level L43 of the variable optical attenuation unit 20 is detected by the photodetector 43.

In step S21, the abnormal loss detection invalidating unit 71 compares the light level L43 with the invalidation threshold level Tc2 and, if the light level L43 is lower than the invalidation threshold level Tc2, outputs the detection invalidating signal to the abnormal loss detecting unit 61 to invalidate the detection operation of the abnormal loss detecting unit 61 for detecting abnormality in the amount of loss in the dispersion-compensating fiber 22 (step S22). Then, the process returns to step S20.

When the number of multiplexed wavelengths input to the optical fiber amplifier 1 is 0, the DCF loss compensating unit 51 reduces the amount of loss to be introduced by the variable optical attenuation unit 20, and the light level L43 detected by the photodetector 43 increases; as a result, the light level L43 becomes higher than the invalidation threshold level Tc2 in step S21.

On the other hand, when the number of multiplexed wavelengths input to the optical fiber amplifier 1 is 1 or larger, the light level L43 is always higher than the invalidation threshold level Tc2 in step S21.

In such cases, the abnormal loss detection invalidating unit 71 does not output the detection invalidating signal, and the process proceeds to step S23.

The abnormal loss detecting unit 61 compares the difference |Lv43−Lv44| between the light levels L43 and L44 detected by the photodetectors 43 and 44 with the threshold value TL (steps S23 and S24) and, if the difference |Lv43−Lv44| is larger than the threshold value TL, outputs the abnormal loss notification (step S25).

According to this method, when the light level detected by the photodetector 44 is low, the abnormality detection is not performed, preventing the abnormal loss notification from being output erroneously; on the other hand, during the operation of the optical fiber amplifier 1, abnormal loss occurring in the dispersion-compensating fiber 22 can be detected instantly.

While the present invention has been described with reference to the preferred embodiments selected only for illustrative purposes, it is apparent to those skilled in the art that various modifications, omissions, and departures can be made to these embodiments without departing from the spirit and scope of the present invention. Further, it is to be understood that the terms used in the appended claims are not limited to the specific meanings used in the embodiments described in this specification.

What is claimed is:

1. An optical amplifier for amplifying wavelength-division multiplexed light, comprising a first optical amplification unit which amplifies input light, a variable optical attenuation unit which attenuates an output of said first optical amplification unit, a second optical amplification unit which amplifies an output of said variable optical attenuation unit, and a loss amount control unit which controls an amount of loss to be introduced by said variable optical attenuation unit, wherein an external attenuating optical medium is inserted between said variable optical attenuation unit and said second optical amplification unit, and said loss amount control unit compensates for variations in optical loss of said external attenuating optical medium by controlling the amount of loss to be introduced by said variable optical attenuation unit, said optical amplifier further comprising:
  an abnormality detecting unit which detects abnormality in optical loss between said first and second optical amplification units based on a light level detected between said external attenuating optical medium and said second optical amplification unit; and
  a detection invalidating unit which invalidates any abnormality detected by said abnormality detecting unit when a light level detected between said variable optical attenuation unit and said external attenuating optical medium is lower than a predetermined threshold level.

2. The optical amplifier as claimed in claim 1, wherein said abnormality detecting unit detects said abnormality when said external attenuating optical medium is disconnected from an input/output port of said optical amplifier, and
said predetermined threshold level represents the light level that said variable optical attenuation unit is to output when the number of multiplexed wavelengths input to said optical amplifier is 0 and when the amount of loss introduced by said variable optical attenuation unit is minimum.

3. The optical amplifier as claimed in claim 2, wherein said abnormality detecting unit detects said abnormality when the light level detected between said external attenuating optical medium and said second optical amplification unit drops below a predetermined level, and wherein said predetermined level is set lower than a level obtained by subtracting from said predetermined threshold level a predetermined maximum amount of loss permitted in said optical amplifier as the amount of loss due to the insertion of said external attenuating optical medium.

4. The optical amplifier for amplifying wavelength-division multiplexed light, comprising a first optical amplification unit which amplifies input light, a variable optical attenuation unit which attenuates an output of said first optical amplification unit, a second optical amplification unit which amplifies an output of said variable optical attenuation unit, and a loss amount control unit which controls an amount of loss to be introduced by said variable optical attenuation unit, wherein an external attenuating optical medium is inserted between said variable optical attenuation unit and said second optical amplification unit, and said loss amount control unit compensates for variations in optical loss of said external attenuating optical medium by controlling the amount of loss to be introduced by said variable optical attenuation unit, said optical amplifier further comprising:

an abnormal loss detecting unit which detects an excessive loss in said external attenuating optical medium based on a difference between light levels detected before and after said external attenuating optical medium; and an abnormal loss detection invalidating unit which invalidates any abnormality detected by said abnormal loss detecting unit when the light level detected between said variable optical attenuation unit and said external attenuating optical medium is lower than a predetermined threshold level, wherein said predetermined threshold level represents the light level that said variable optical attenuation unit is to output when the number of multiplexed wavelengths input to said optical amplifier is 1 and when the amount of loss introduced by said variable optical attenuation unit is equal to a predetermined amount of loss, and said predetermined amount of loss is the amount of loss necessary to compensate for a predetermined minimum amount of loss permitted in said optical amplifier as the amount of loss due to the insertion of said external attenuating optical medium.

5. An abnormality detection method used in an optical amplifier for amplifying wavelength-division multiplexed light, wherein said optical amplifier comprises a first optical amplification unit which amplifies input light, a variable optical attenuation unit which attenuates an output of said first optical amplification unit, a second optical amplification unit which amplifies an output of said variable optical attenuation unit, and a loss amount control unit which controls an amount of loss to be introduced by said variable optical attenuation unit, wherein an external attenuating optical medium is inserted between said variable optical attenuation unit and said second optical amplification unit, and said loss amount control unit compensates for variations in optical loss of said external attenuating optical medium by controlling the amount of loss to be introduced by said variable optical attenuation unit, and wherein said abnormality detection method detects abnormality in optical loss between said first and second optical amplification units, comprising:

detecting abnormality in optical loss between said first and second optical amplification units based on a light level detected between said external attenuating optical medium and said second optical amplification unit; and disabling detection of said abnormality when a light level detected between said variable optical attenuation unit and said external attenuating optical medium is lower than a predetermined threshold level.

6. The abnormality detection method as claimed in claim 5, wherein said abnormality is detected when said external attenuating optical medium is disconnected from an input/output port of said optical amplifier, and said predetermined threshold level represents the light level that said variable optical attenuation unit is to output when the number of multiplexed wavelengths input to said optical amplifier is 0 and when the amount of loss introduced by said variable optical attenuation unit is minimum.

7. The abnormality detection method as claimed in claim 6, wherein said abnormality is detected when the light level detected between said external attenuating optical medium and said second optical amplification unit drops below a predetermined level, and wherein said predetermined level is set lower than a level obtained by subtracting from said predetermined threshold level a predetermined maximum amount of loss permitted in said optical amplifier as the amount of loss due to the insertion of said external attenuating optical medium.

8. An abnormality detection method used in an optical amplifier for amplifying wavelength-division multiplexed light, wherein said optical amplifier comprises a first optical amplification unit which amplifies input light, a variable optical attenuation unit which attenuates an output of said first optical amplification unit, a second optical amplification unit which amplifies an output of said variable optical attenuation unit, and a loss amount control unit which controls an amount of loss to be introduced by said variable optical attenuation unit, wherein an external attenuating optical medium is inserted between said variable optical attenuation unit and said second optical amplification unit, and said loss amount control unit compensates for variations in optical loss of said external attenuating optical medium by controlling the amount of loss to be introduced by said variable optical attenuation unit, wherein said abnormality detection method detects abnormality in optical loss between said first and second optical amplification units, comprising:

detecting an excessive loss in said external attenuating optical medium based on a difference between light levels detected before and after said external attenuating optical medium; and disabling detection of said abnormality when the light level detected between said variable optical attenuation unit and said external attenuating optical medium is lower than a predetermined threshold level, wherein said predetermined threshold level represents the light level that said variable optical attenuation unit is to output when the number of multiplexed wavelengths input to said optical amplifier is 1 and when the amount of loss introduced by said variable optical attenuation unit is equal to a predetermined amount of loss, and said predetermined amount of loss is the amount of loss necessary to compensate for a predetermined minimum amount of loss permitted in said optical amplifier as the amount of loss due to the insertion of said external attenuating optical medium.

* * * * *